United States Patent [19]
Paolucci

[11] Patent Number: 5,211,292
[45] Date of Patent: May 18, 1993

[54] APPARATUS FOR STORING AUDIO/VIDEO CASSETTES AND COMPACT DISCS

[76] Inventor: Barbara A. Paolucci, 541-86th St, Box 6, Brooklyn, N.Y. 11209

[21] Appl. No.: 821,499

[22] Filed: Dec. 19, 1991

[51] Int. Cl.$^5$ .............................................. A47B 47/00
[52] U.S. Cl. ....................................... 211/40; 211/41; 211/88; 211/194; 108/91
[58] Field of Search ................... 211/40, 41, 71, 88, 211/194, 188, 42, 43; 108/91

[56]  References Cited
U.S. PATENT DOCUMENTS

| | | | |
|---|---|---|---|
| 371,044 | 10/1887 | Dimes | 211/40 X |
| 3,285,429 | 11/1966 | Propst | 211/43 X |
| 4,228,743 | 10/1980 | Crook | 108/91 X |
| 4,817,263 | 4/1989 | Donalson et al. | 211/41 X |
| 4,961,506 | 10/1990 | Lang | 211/88 |
| 5,038,942 | 8/1991 | Wright | 211/194 X |
| 5,078,270 | 1/1992 | Campbell | 211/194 |

Primary Examiner—Alvin C. Chin-Shue
Attorney, Agent, or Firm—Michael I. Kroll

[57]  ABSTRACT

An apparatus is provided for storing audio/video cassettes and compact discs which consists of a plurality of shelf units. Each shelf unit is sized to hold only one type of the audio/video cassettes and compact discs therein. A mechanism is for mounting each shelf unit against a vertical flat surface. A structure is for interconnecting the shelf units together in a stacked one over the other relationship against the vertical flat surface.

6 Claims, 2 Drawing Sheets

APPARATUS FOR STORING AUDIO/VIDEO CASSETTES AND COMPACT DISCS

BACKGROUND OF THE INVENTION

1. Field of the Invention

The instant invention relates generally to storage devices and more specifically it relates to an apparatus for storing audio/video cassettes and compact discs.

2. Description of the Prior Art

Numerous storage devices have been provided in prior art that are adapted to hold a plurality of box shaped articles and the like therein. While these units may be suitable for the particular purpose to which they address, they would not be as suitable for the purposes of the present invention as heretofore described.

SUMMARY OF THE INVENTION

A primary object of the present invention is to provide an apparatus for storing audio/video cassettes and compact discs that will overcome the shortcomings of the prior art devices.

Another object is to provide an apparatus for storing audio/video cassettes and compact discs which includes a plurality of storage shelf units that are adapted to be mounted on under the other onto a flat vertical surface.

An additional object is to provide an apparatus for storing audio/video cassettes and compact discs in which each shelf unit will hold only one type of item therein and is interconnectable to another shelf unit, so that the shelf units will be stacked one over the other.

A further object is to provide an apparatus for storing audio/video cassettes and compact discs that is simple and easy to use.

A still further object is to provide an apparatus for storing audio/video cassettes and compact discs that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
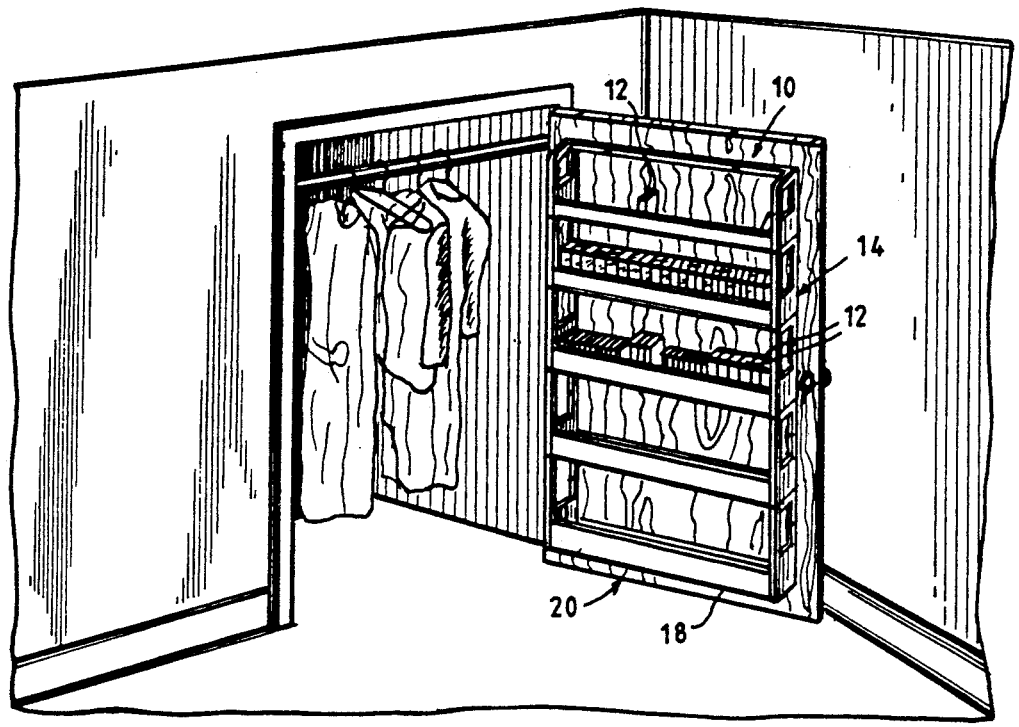
FIG. 1 is a perspective view of a room with the instant invention mounted to a door.

Turning now descriptively to the drawings, in which similar reference characters denote similar elements throughout the several views, the Figures illustrate an apparatus 10 for storing audio/video cassettes and compact discs 12, which consists of a plurality of shelf units 14. Each shelf unit 14 is sized to hold only one type of audio/video cassettes and compact discs 12 therein. A mechanism 16 is for mounting each shelf unit 14 against a vertical flat surface 18, such as the back of a door 20 and the like. Another structure 22 is for interconnecting the shelf units 14 together in a stacked one over the other relationships against the vertical flat surface 18.

Figure 2:
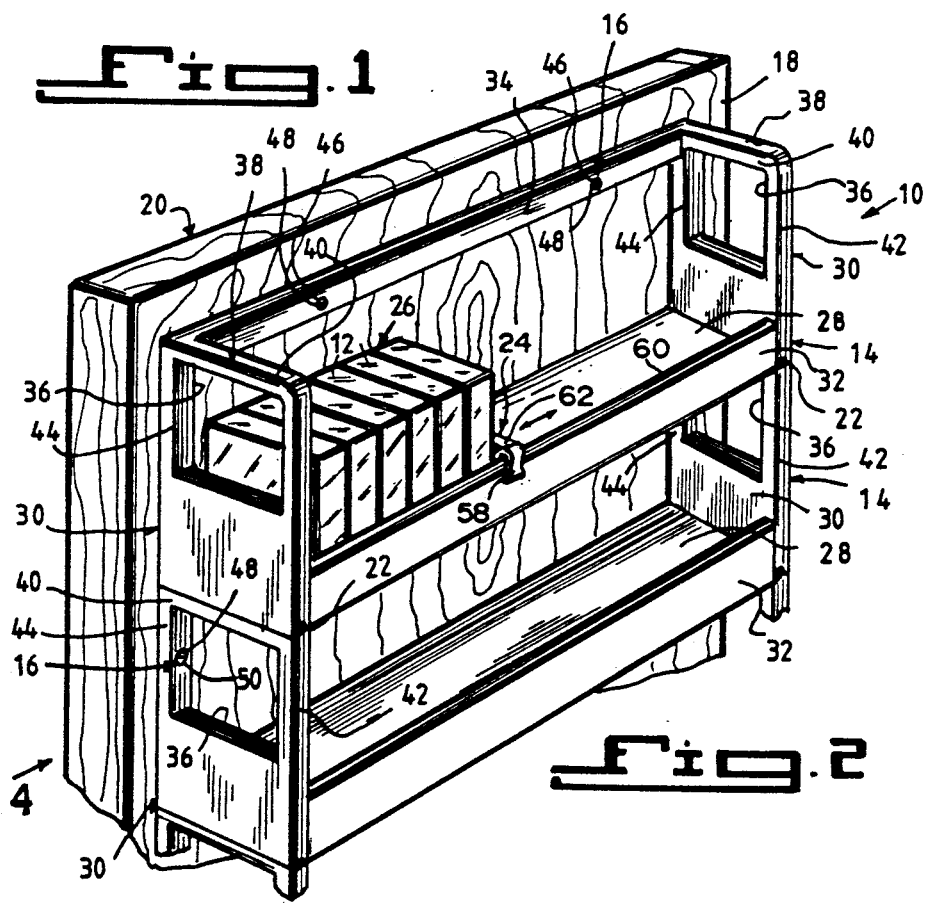
FIG. 2 is an enlarged perspective view of the upper portion of the door showing two of the shelf units thereon.

As shown in FIG. 2, the apparatus 10 further includes a device 24 adjustably attached to any of the shelf units 14 at an end of an incomplete row 26 that is less than fully stocked with the only one type of audio/video cassettes and compact discs 12, for propping up the incomplete row 26, so as to prevent the incomplete row 26 from falling over.

Each shelf unit 14 includes an elongated bottom wall 28. A pair of spaced parallel side walls 30 are attached to the elongated bottom wall 28. An elongated front wall 32 shorter in height than the side walls 30 forms an open front for access into the shelf unit 14, so that the only one type of audio/video cassettes and compact discs 12 can be inserted therein. The height of the front wall 32, should be tall enough to prevent the contents of the shelf unit 14 from falling out when the door 20 is closed abruptly.

The upper shelf unit 14 further includes an elongated cross bar 34 extending between the top rear corners of the side walls 30 to add stability to the upper shelf unit 14.

Each shelf unit 14 further includes each side wall 30 having an opening 36 near its top edge 38 thereof to form a top rail 40, a front rail 42 and a back rail 44, so that the top rails 40 can be gripped by the hands of a person, when each shelf units 14 is being mounted against the vertical flat surface 18.

The mounting mechanism 16 for the upper shelf unit 14 includes the elongated cross bar 34 having a pair of spaced apertures 46 therein. Two fasteners 48 are provided, with each extending through one of the apertures 46 in the elongated cross bar 34 and into the vertical flat surface 18.

The mounting mechanism 16 for each of the other shelf units 14 includes each side wall 30 having a transverse aperture 50 through the back rail 44. Two fasteners 48 are also provided, with each extending through one transverse aperture 50 in each back rail 44 and into the vertical flat surface 18.

The interconnecting structure 22 for each shelf unit 14 includes each side wall 30 having a T-shaped tongue 52 along its top edge 38 on the top rail 40 and a T-shaped groove 54 along its bottom edge 56. Each T-shaped tongue 52 ca slide into the respective groove 54 on the shelf unit 14 directly above.

Figure 3:
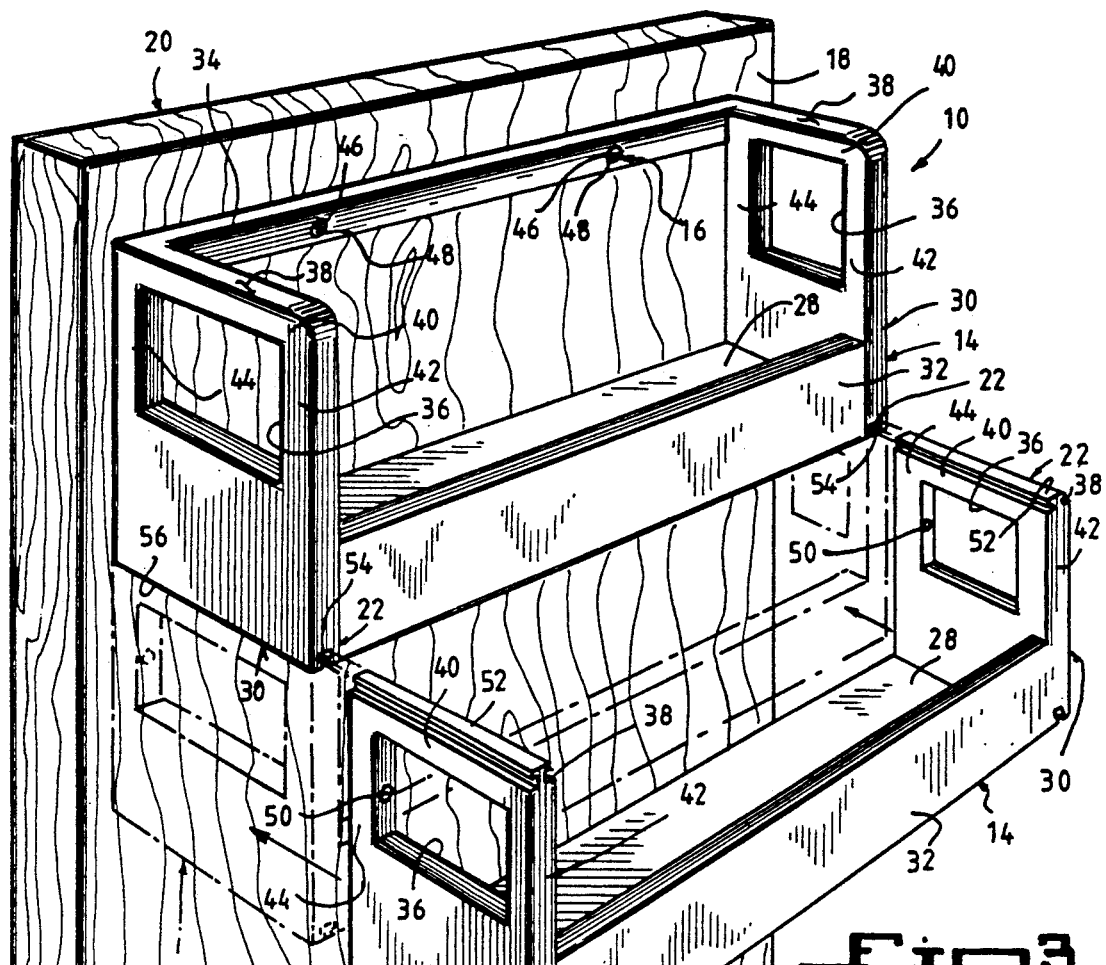
FIG. 3 is an enlarged perspective view of the upper portion of the door showing the lower shelf unit ready to be inserted under the upper shelf unit.
Figure 4:
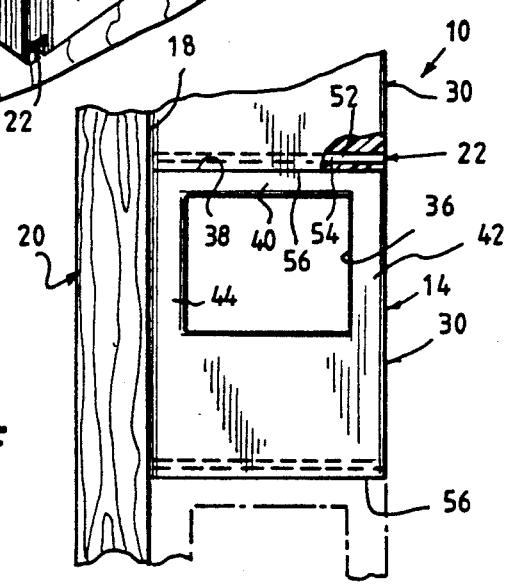
FIG. 4 is a side view taken in direction of arrow 4 in FIG. 2 with parts broken away and in section.

The interconnecting structure 22 for the upper shelf unit 14 includes each side wall 30 only having a T-shaped groove 54 along its bottom edge 56. Each T-shaped tongue 52 from the other shelf unit 14 directly below can slide into the respective groove 54 on the upper shelf unit 14 (see FIG. 3).

The propping up mechanism 24 includes a clip member 58 which can adjustably grip a top edge 60 of the elongated front wall 32. A finger 62 is rearwardly attached to the clip member 58, so as to bear against the incomplete row 26 that is less than fully stocked with the only one type of audio/video cassettes and compact discs 12 and hold them in place. Each shelf unit 14 is fabricated out of a durable strong material, such as plastic, metal and the like.

LIST OF REFERENCE NUMBERS 10 storing apparatus
12 audio/video cassettes and compact discs
14 shelf unit
16 mounting mechanism
18 vertical flat surface
20 door
22 interconnecting structure
24 propping up device
26 incomplete row of 12
28 elongated bottom wall
30 side wall
32 elongated front wall
34 elongated cross bar
36 opening in 30
38 top edge of 30
40 top rail
42 front rail
44 back rail
46 aperture in 34
48 fastener
50 transverse aperture in 44
52 T-shaped tongue on 38
54 T-shaped groove on 56
56 bottom edge of 30
58 clip member
60 top edge of 32
62 finger It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for storing audio/video cassettes and compact discs which comprises;
    a) a plurality of shelf units, each said shelf unit is sized to hold only one size of the audio/video cassettes and compact discs in a vertical position therein so that each of said shelf units will carry a different sized audio/video cassette and compact disc, each said shelf unit further includes an elongated bottom wall; a pair of spaced parallel side walls attached to said elongated bottom wall; and an elongated front-wall shorter in height than said side walls, forming an open front for access into said shelf unit; each said side wall having an opening near its top edge thereof, to form a top rail, a front rail and a back rail, so that said top rails can be gripped by the hands of a person when each said shelf unit is being mounted against the vertical flat surface;
    b) means for mounting each said shelf unit against a vertical flat surface, said mounting means for each shelf unit includes each said side wall having a transverse aperture through said back rail and two fasteners, each extending through one said transverse aperture in each said back rail and into the vertical flat surface;
    c) means for interconnecting said shelf units together in a stacked one over the other vertical relationship against the vertical flat surface;
    d) a clip member having a pair of vertical legs which can adjustably grip a top edge of said elongated front wall; and
    e) a finger rearwardly attached to said clip member, so as to bear against an incomplete row that is less than fully stocked with the only one type of audio/video cassettes and compact discs and hole them in place.

2. An apparatus for storing audio/video cassettes and compact discs as recited in claim 1, wherein an upper shelf unit further includes an elongated cross bar extending between the top rear corners of said side walls to add stability to said upper shelf unit.

3. An apparatus for storing audio/video cassettes and compact discs as recited in claim 1, wherein said mounting means for said upper shelf unit includes;
    a) said elongated cross bar having a pair of spaced apertures therein; and
    b) two fasteners, each extending through one of said apertures in said elongated cross bar and into the vertical flat surface.

4. An apparatus for storing audio/video cassettes and compact discs as recited in claim 1, wherein said interconnecting means for each said shelf unit includes each said side wall having a T-shaped tongue along its top edge on said top rail and a T-shaped groove along its bottom edge, so that each said T-shaped tongue can slide into said respective groove on said shelf unit directly above, each top shelf unit is void of having a T-shaped tongue along its top edge.

5. An apparatus for storing audio/video cassettes and compact discs as recited in claim 4, wherein said interconnecting means for said upper shelf unit includes each said side wall having a T-shaped groove along its bottom edge, so that each said T-shaped tongue from said other shelf unit directly below can slide into said respective groove on said upper shelf unit.

6. An apparatus for storing audio/video cassettes and compact discs as recited in claim 5, wherein each said shelf unit is fabricated out of a durable strong material.

* * * * *